(12) United States Patent
Matsumoto et al.

(10) Patent No.: US 11,600,292 B1
(45) Date of Patent: Mar. 7, 2023

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Takuya Matsumoto, Kawasaki Kanagawa (JP); Yusuke Tomoda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/549,465

(22) Filed: Dec. 13, 2021

(30) Foreign Application Priority Data

Aug. 25, 2021 (JP) .............................. JP2021-137227

(51) Int. Cl.
*G11B 5/54* (2006.01)
*G11B 5/012* (2006.01)
*G11B 21/10* (2006.01)

(52) U.S. Cl.
CPC ............ *G11B 5/012* (2013.01); *G11B 21/106* (2013.01)

(58) Field of Classification Search
CPC .... G11B 2020/1238; G11B 2020/1292; G11B 5/604; G11B 11/10543; G11B 7/1263; G11B 7/1267; G11B 7/126; G11B 20/10388; G11B 20/1803; G11B 2005/0021; G11B 5/54
USPC .......... 360/75, 59, 328; 369/116, 53.26, 47.5
See application file for complete search history.

(56) References Cited

U.S. PATENT DOCUMENTS

| | | | |
|---|---|---|---|
| 8,797,672 B2 | 8/2014 | Tanabe et al. | |
| 9,355,671 B2* | 5/2016 | Rausch | G11B 7/1267 |
| 9,916,849 B1 | 3/2018 | Mader et al. | |
| 10,720,177 B1 | 7/2020 | Ng et al. | |
| 10,825,478 B1* | 11/2020 | Matsumoto | G11B 20/1803 |
| 2020/0365183 A1 | 11/2020 | Matsumoto | |

FOREIGN PATENT DOCUMENTS

JP 2020-187815 A 11/2020

* cited by examiner

*Primary Examiner* — Nabil Z Hindi
(74) *Attorney, Agent, or Firm* — Kim & Stewart LLP

(57) ABSTRACT

According to one embodiment, a magnetic disk device comprises a magnetic disk, a magnetic head, a monitoring unit, and a control unit. When carrying out write of data to a first track, if an absolute difference between a light output monitored by the monitoring unit at the time of write and a light output monitored last time by the monitoring unit exceeds a predetermined value, the control unit controls a position of a write head and writes data again to the first track or a second track one track before the first track.

6 Claims, 7 Drawing Sheets

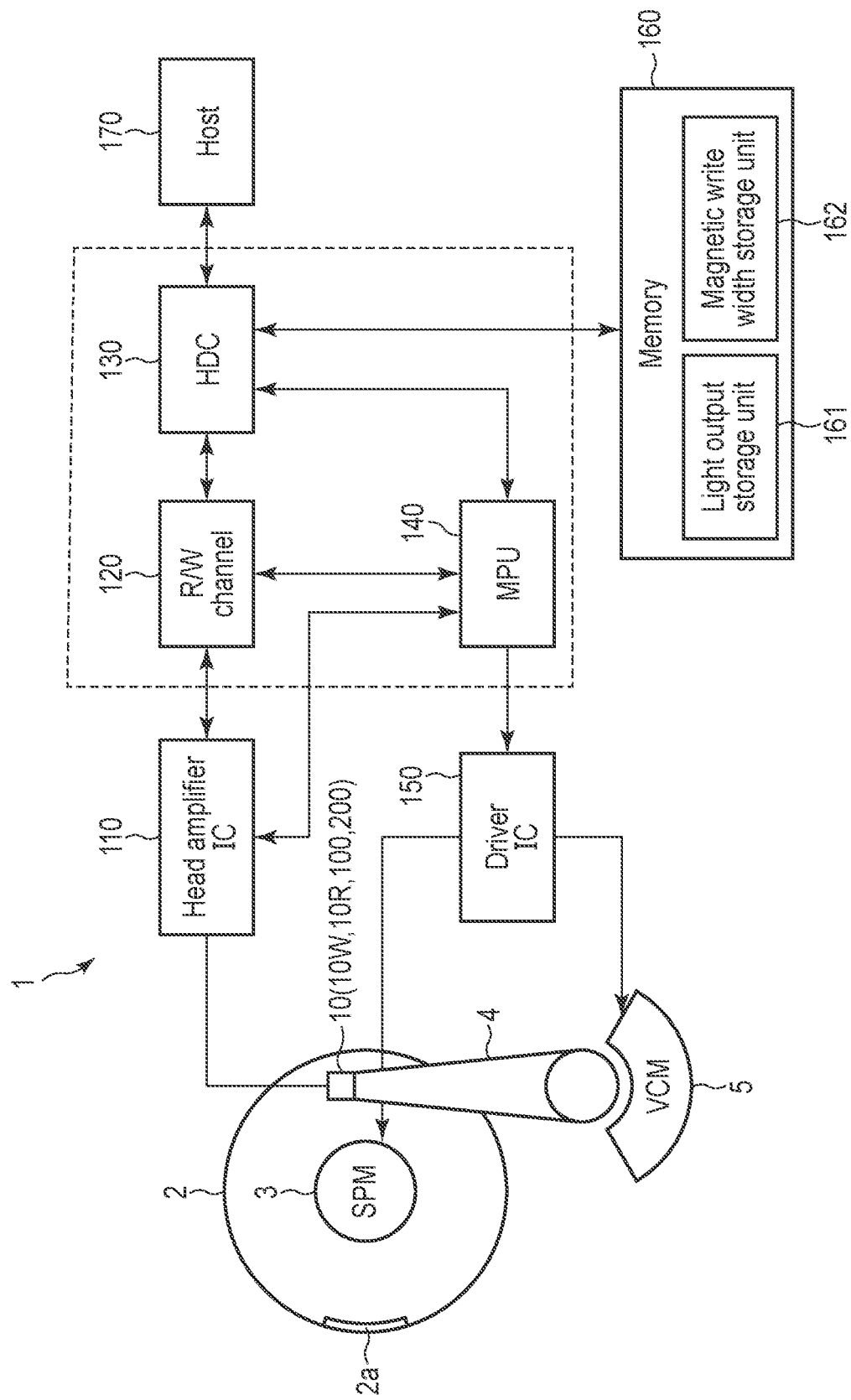
F I G. 1

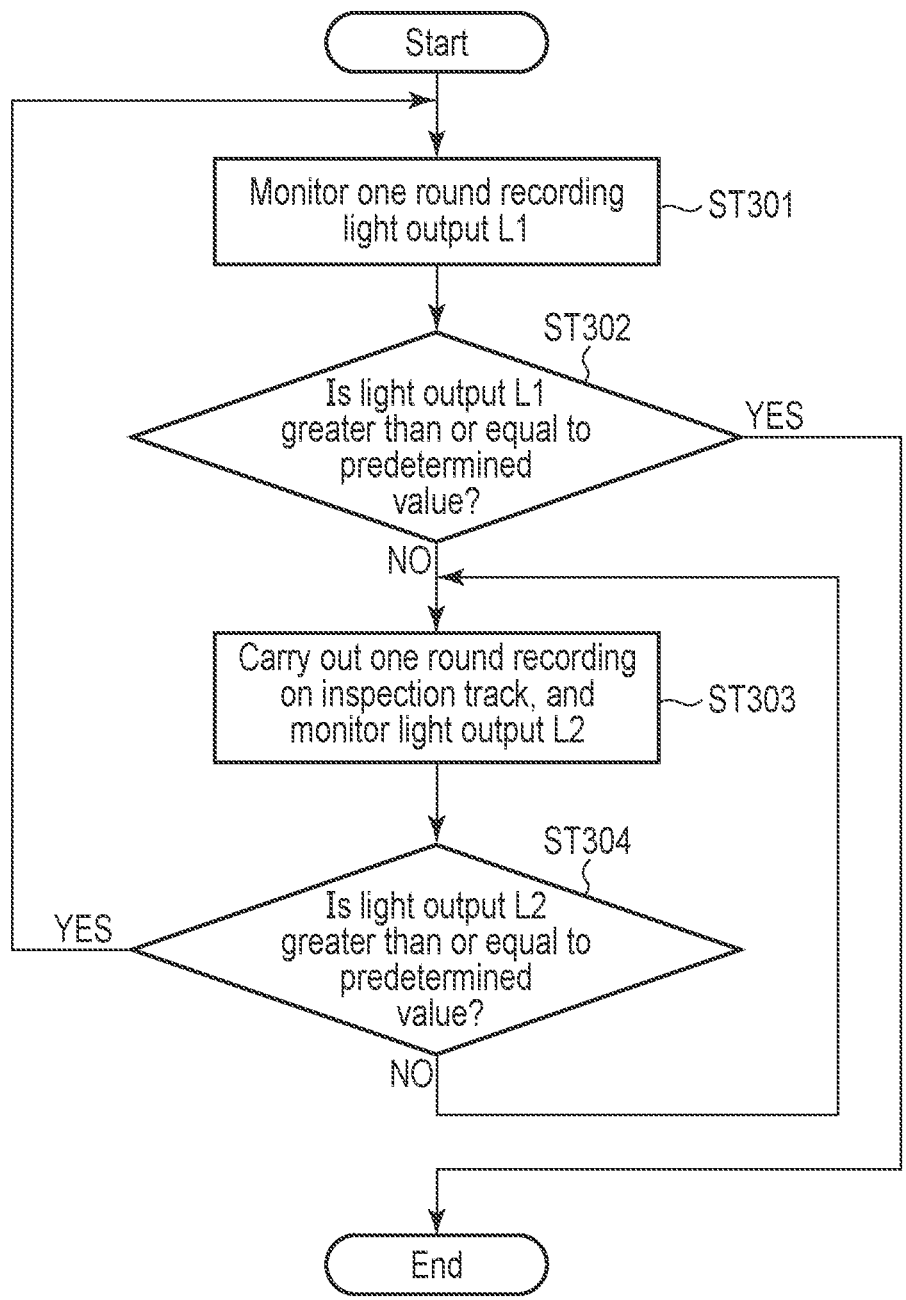
F I G. 14

MAGNETIC DISK DEVICE

CROSS-REFERENCE TO RELATED APPLICATIONS

This application is based upon and claims the benefit of priority from Japanese Patent Application No. 2021-137227, filed Aug. 25, 2021, the entire contents of which are incorporated herein by reference.

FIELD

Embodiments described herein relate generally to a magnetic disk device.

BACKGROUND

A magnetic disk device including a magnetic head configured to assist write of data by means of a thermal assist unit is known. In this kind of magnetic disk device, a magnetic head includes a near-field optical element. By applying light from a laser diode functioning as a light source to the near-field optical element, this magnetic head makes the optical element emit near-field light from the element tip end to thereby locally heat a medium recording layer having high perpendicular magnetic anisotropy. At the heated recording layer part, the coercive force sufficiently lowers at the time of recording, and hence a high degree of densification in recording is enabled.

However, there is sometimes a case where a phenomenon called mode hopping in which the oscillation wavelength varies due to the environmental temperature, self-heating or the like occurs to the laser diode. When this phenomenon occurs, although the laser diode is driven by a fixed laser current, the light output varies. When this mode hopping occurs during write of data, the heating range of the medium recording layer varies due to the variation in the light output. Accordingly, for example, when the heating range spreads, there is apprehension that information of the adjacent track may be erased. Such apprehension becomes more conspicuous in the shingled magnetic recording system in which overwriting is carried out.

Embodiments described herein aim to provide a magnetic disk device capable of maintaining the signal quality even when mode hopping occurs in the shingled recording system.

BRIEF DESCRIPTION OF THE DRAWINGS

FIG. 1 is a block diagram showing an example of the control configuration of a magnetic disk device according to an embodiment.

FIG. 14 is a flowchart showing an example of processing of adjusting a light output according to the embodiment.

DETAILED DESCRIPTION

Figure 2:
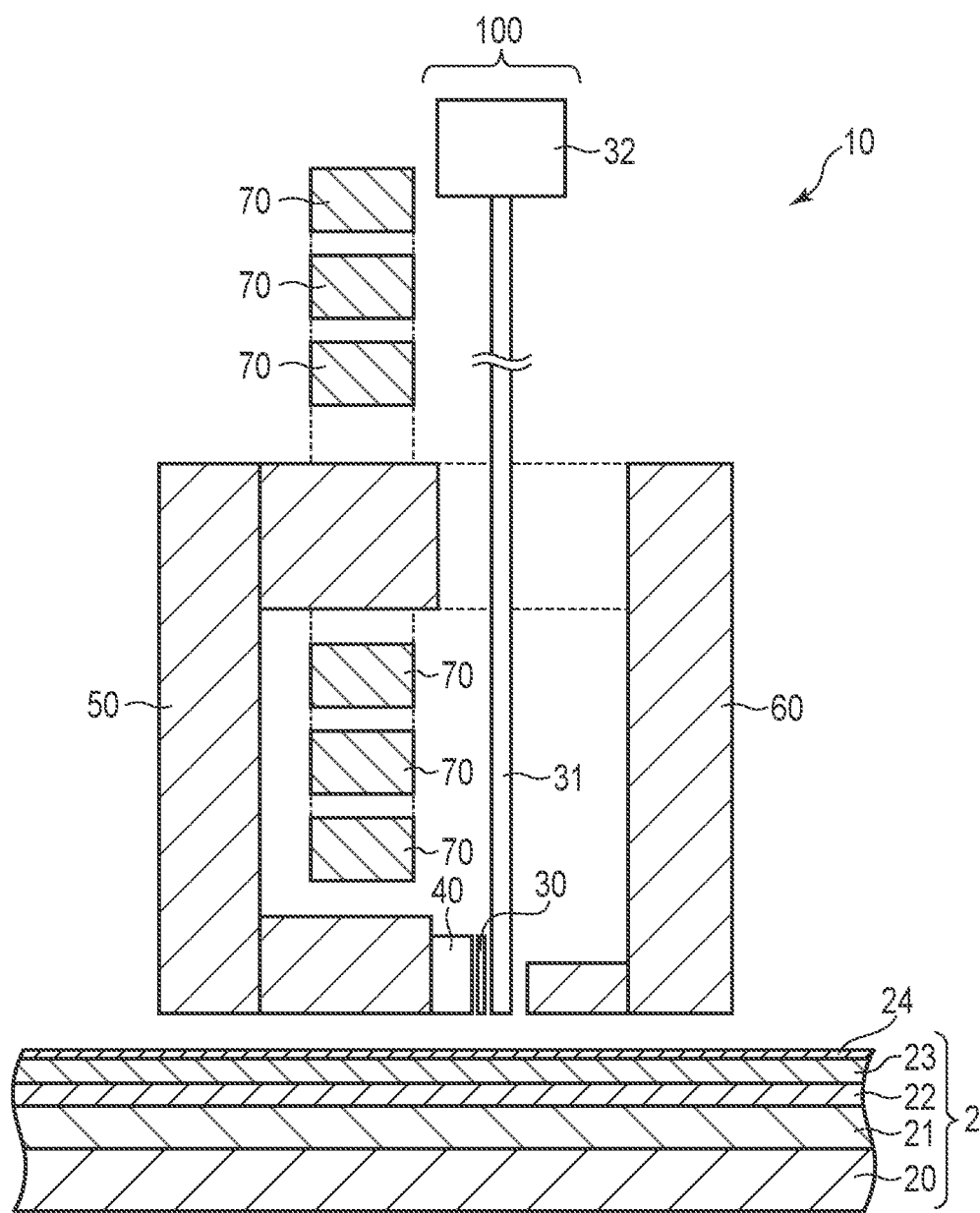
FIG. 2 is a view showing an example of a cross section of a write head part of a magnetic head including a thermal assist unit and magnetic disk according to the embodiment.

In general, according to one embodiment, a magnetic disk device comprises a magnetic disk, a magnetic head, a monitoring unit, and a control unit. The magnetic head includes a write head which writes data to the magnetic disk, a thermal assist unit which assists the write head in write of data by using a near-field optical element, and a read head which reads data from the magnetic disk. The monitoring unit monitors a light output. The control unit controls read of data from the magnetic disk to be carried out by the magnetic head and write of data to the magnetic disk according to a shingled magnetic recording system. When carrying out write of data to a first track, if an absolute difference between a light output monitored by the monitoring unit at the time of write and a light output monitored last time by the monitoring unit exceeds a predetermined value, the control unit controls a position of the write head and writes data again to the first track or a second track one track before the first track.

First Embodiment

The control configuration of a magnetic disk device 1 will be described below. FIG. 1 is a block diagram showing an example of the control configuration of the magnetic disk device.

As shown in FIG. 1, the magnetic disk device 1 includes a magnetic disk 2, spindle motor (SPM) 3, actuator assembly 4, voice coil motor (VCM) 5, and magnetic head 10. The magnetic disk 2 is provided with a management area 2a on which information used to manage data to be recorded is recorded.

Furthermore, the magnetic disk device 1 includes a head amplifier IC 110, R/W channel 120, hard disk controller (HDC) 130, microprocessor (MPU) 140, driver IC 150, and memory 160. Further, the magnetic disk device 1 is connectable to a host computer (host) 170. It should be noted that the R/W channel 120, HDC 130, and MPU 140 may also be incorporated in a one-chip integrated circuit.

The magnetic head 10 includes a write head 10W, read head 10R, thermal assist unit 100, and monitoring unit 200. The write head 10W writes data to the magnetic disk 2. The read head 10R reads data from the magnetic disk 2. When the write head 10W writes data to the magnetic disk 2, the thermal assist unit 100 assists the write head 10W in write of data. The structure of the thermal assist unit 100 will be described later with reference to FIG. 2. The monitoring unit 200 detects the light output of the thermal assist unit 100. Although this monitoring unit 200 will be described in this embodiment about a case where a photo-detector is incorporated into the magnetic head 10, the description is not limited to this, and a bolometer may be incorporated into the magnetic head 10, and the value detected by the bolometer may be converted into a light output. Further, as the data write system of the magnetic disk device 1, although there are the shingled magnetic recording system and conventional recording system, the write head 10W of this embodiment carries out write of data according to the shingled magnetic recording system.

The spindle motor 3 is driven by a drive current (or drive voltage) to be supplied thereto from the driver IC 150. On/from the magnetic disk 2, a data pattern is recorded/reproduced by the magnetic head 10.

By operating the voice coil by the voice coil motor 5, and swinging the actuator assembly 4 from the unload position of the ramp load mechanism (illustration omitted), the magnetic head 10 is moved to a position on a desired track of the magnetic disk 2 and is positioned to a predetermined position on the magnetic disk 2. The voice coil motor 5 is driven by a drive current (or drive voltage) to be supplied thereto from the driver IC 150.

The head amplifier IC 110 supplies a write signal (write current) corresponding to write data to be supplied thereto from the R/W channel 120 to the write head 10W. Further, the head amplifier IC 110 controls a light output to be output from the thermal assist unit 100. Further, the head amplifier IC 110 amplifies a read signal output from the read head 10R, and transmits the amplified read signal to the R/W channel 120.

The R/W channel 120 is a signal processing circuit configured to process a signal relevant to read/write. The R/W channel 120 includes a read channel configured to execute signal processing of read data, and write channel configured to execute signal processing of write data. The read channel converts a read signal into digital data, and decodes read data from the digital data. The write channel encodes write data to be transferred thereto from the HDC 130, and transfers the encoded write data to the head amplifier IC 110.

The HDC 130 controls write of data to the magnetic disk 2 through the magnetic head 10, head amplifier IC 110, R/W channel 120, and MPU 140, and read of data from the magnetic disk 2. The HDC 130 constitutes an interface between the magnetic disk device 1 and host 170, and executes transfer control of read data and write data. That is, the HDC 130 functions as a host interface controller configured to receive a signal transferred from the host 170 and transfer a signal to the host 170. Further, the HDC 130 receives a command (write command, read command, and the like) transferred from the host 170, and transmits the received command to the MPU 140.

The MPU 140 is a main controller (control unit) of the magnetic disk device 1, and executes control of a read/write operation, servo control, and the like necessary for positioning of the magnetic head 10. Furthermore, the MPU 140 executes processing of preventing deterioration in the quality of a signal to be recorded on the magnetic disk 2 from occurring, however, details of the processing will be described later.

The driver IC 150 controls drive of the spindle motor 3 and voice coil motor 5 according to the control of the MPU 140. By driving the voice coil motor 5, the magnetic head 10 is positioned to a target track on the magnetic disk 2.

The memory 160 includes a volatile memory and non-volatile memory. For example, the memory 160 includes a buffer memory constituted of a DRAM and flash memory. The flash memory of the memory 160 stores therein programs and parameters necessary for processing of the MPU 140 and is provided with a light output storage unit 161 and magnetic write width storage unit 162. The light output storage unit 161 stores therein a light output to be monitored by the monitoring unit 200. The magnetic write width storage unit 162 stores therein a measured magnetic write width. The light output and magnetic write width are respectively stored in the light output storage unit 161 and magnetic write width storage unit 162 by the processing of FIG. 10 to be described later.

The magnetic disk device 1 of this embodiment includes the magnetic head 10 possessing the thermal assist unit 100 adopting the thermal assist recording system. FIG. 2 is a view showing an example of a cross section of a write head part of the magnetic head 10 including the thermal assist unit 100 and magnetic disk 2.

The magnetic disk 2 is a recording medium including a vertical recording layer 23 formed on a substrate 20 and having high anisotropy in a direction perpendicular to the disk surface of the magnetic disk 2, crystalline orientation layer 22 arranged in the lower layer part of the vertical recording layer 23 in order to improve the orientation of the vertical recording layer 23, heat-sink layer 21 arranged in the lower layer part of the crystalline orientation layer 22 in order to suppress the spread of the heated region, and protective film 24 arranged at the upper part of the vertical recording layer 23.

The magnetic head 10 is a discrete type of magnetic head in which the recording head and reproducing head are separate from each other, and the recording head part is configured to include a main pole 40 constituted of a high magnetic permeability material configured to generate a magnetic field in a direction perpendicular to the magnetic disk surface, trailing yoke 50 magnetically joined to the main pole 40 and configured to make a magnetic flux flow through the main pole 40, return shield magnetic pole 60 arranged on the leading side of the main pole 40 and provided to efficiently close the magnetic path directly under the main pole 40, coil 70 arranged in such a manner as to wind around the magnetic path including the trailing yoke 70 and return shield magnetic pole 60 in order to make a magnetic flux flow through the main pole 40, near-field optical element 30 arranged on the leading side of the main pole 40 and configured to generate near-field light for heating the recording layer of the recording medium, and waveguide 31 configured to propagate light for generating the near-field light.

As a light source, a laser diode 32 is incorporated in the magnetic head in such a manner as to be mounted on the slider. It is desirable that the near-field optical element 30 be constituted of Au, Pd, Pt, Rh or Ir, or be constituted of an alloy comprised of a combination of some of these elements. It is desirable that the insulating layer interposed between the main pole 40 and near-field optical element 30 be formed of an oxide constituted of $SiO_2$, $Al_2O_3$ or the like.

Here, the technique of the magnetic disk device will be described below.

A magnetic disk device in which write of data is carried out according to the shingled magnetic recording system and write of data is assisted by a thermal assist unit is known. Regarding this kind of magnetic disk device, a technique of carrying out, prior to write of data, confirmation of the heating temperature of the magnetic disk 2 or confirmation of the signal quality, adjusting the laser power or write offset amount and, thereafter carrying out recording on the track is known.

However, in this magnetic disk device, it is possible that mode hopping may occur even during write of data. When mode hopping occurs during a data write operation, there is a case where it becomes impossible to maintain the quality of the signal to be recorded at a linear recording density (BPI) and track density (TPI) to be set in the manufacturing process.

Regarding such a case, there is also a technique of coping with a case where detection of mode hopping or mode hopping occurs in a magnetic disk device. However, this technique copes only with the case where write of data is carried out according to the conventional recording system, and does not cope with the case where write of data is carried out according to the shingled magnetic recording system.

Figure 3:
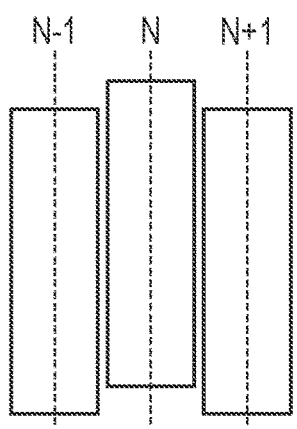
FIG. 3 is a view for explaining the technique of the magnetic disk device.
Figure 4:
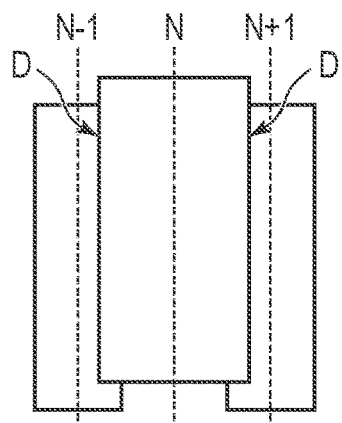
FIG. 4 is a view for explaining the technique of the magnetic disk device.
Figure 5:
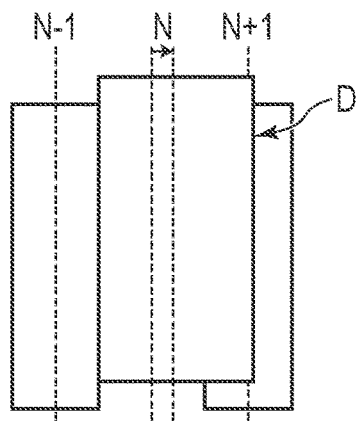
FIG. 5 is a view for explaining the technique of the magnetic disk device.

Furthermore, there is also a technique in which the magnetic disk device monitors the number of times data is written to the (N−1) track and (N+1) which are adjacent to the N (N: natural number) track and, when the value of the counter of the N track exceeds a threshold, carries out processing of rewriting data to the N track. However, the technique does not cope with the case where mode hopping occurs during rewrite of data. For example, as shown in FIG. 3, when data is rewritten to the N track, if the light output becomes larger, the magnetic write width widens. Accordingly, as shown in FIG. 4, there is apprehension that the N track together with the (N−1) track and (N+1) track which are adjacent to the N track may cause deterioration in the signal quality at positions indicated by symbols D. Furthermore, when data is rewritten to the N track with write offset too, deterioration in the signal quality of any one of the adjacent tracks is caused. In FIG. 5, a case where a write offset is made on the right side in FIG. 5 is shown, and there is apprehension that deterioration in the signal quality may be caused at a position indicated by the symbol D.

Figure 6:
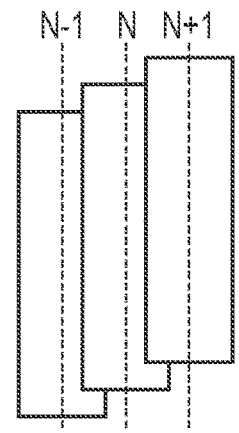
FIG. 6 is a view for explaining the technique of the magnetic disk device.
Figure 7:
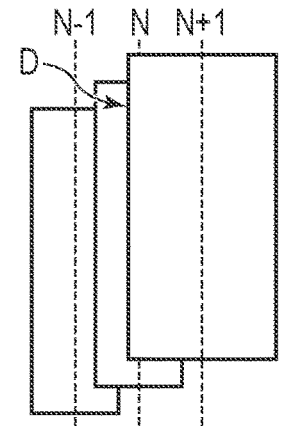
FIG. 7 is a view for explaining the technique of the magnetic disk device.
Figure 8:
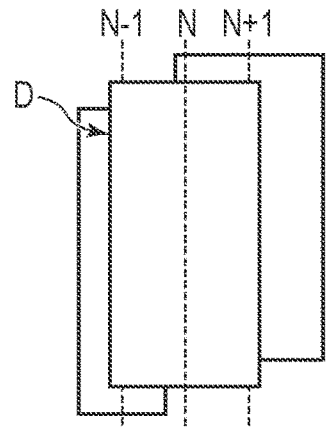
FIG. 8 is a view for explaining the technique of the magnetic disk device.

Further, in a magnetic disk device configured to write data according to the shingled magnetic recording system as shown in FIG. 6, in the case where data is written to the (N+1) track as shown in FIG. 7, and in the case where data is rewritten to the N track as shown in FIG. 8, when data is written, if the light output becomes larger due to mode hopping, the magnetic write width widens due to the influence of the adjacent track. Accordingly, as indicated by the symbol D in each of FIG. 7 and FIG. 8, there is apprehension that deterioration in the signal quality of the adjacent track may be caused.

Figure 9:
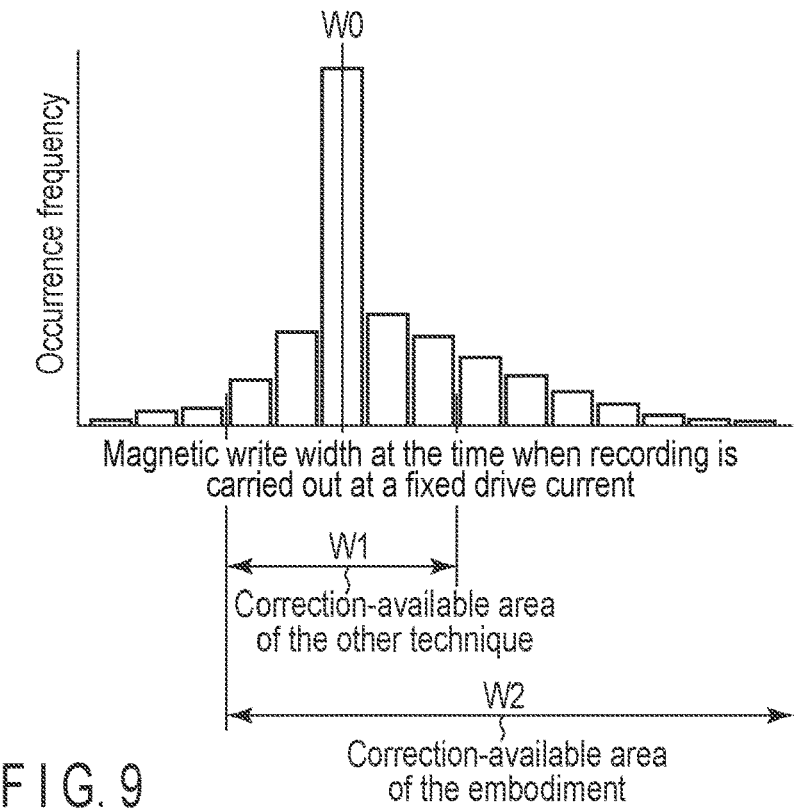
FIG. 9 is a view showing an example of distribution of magnetic write widths obtained when data is written by carrying out drive at an arbitrary fixed laser current.

Next, the technique of the magnetic disk device adopting the conventional recording system with respect to the correction-available area of a case of mode hopping occurrence will be described. FIG. 9 is a view showing an example of distribution of magnetic write widths obtained when data is written by carrying out drive at an arbitrary fixed laser current. As shown in FIG. 9, the case where recording is carried out at the magnetic write width of W0 is the most frequent. However, the case where the magnetic write width becomes less than W0 (left side of W0 in FIG. 9), and case where the magnetic write width becomes greater than W0 (right side of W0 in FIG. 9) occur due to the variation in the light output caused by mode hopping with a certain probability. The technique concerned adopts the conventional recording system, and hence when data is written to the N track, if the magnetic write width widens, there is apprehension that deterioration in the signal quality of the (N−1) track and (N+1) track may be caused. In the magnetic disk device 1 of this embodiment, as will be described later in detail, the offset amount is adjusted and thereafter data recording is carried out again, and hence it is possible to widen the correction-available area as wide as the correction-available area W2 as compared with the correction-available area W1 of the magnetic disk device concerned.

As described above, due to the occurrence of mode hoping, in the magnetic disk device, there is apprehension that deterioration in the signal quality may be caused. Hereinafter, the magnetic disk device 1 of this embodiment capable of preventing such deterioration in the signal quality from occurring will be described in detail.

Figure 10:
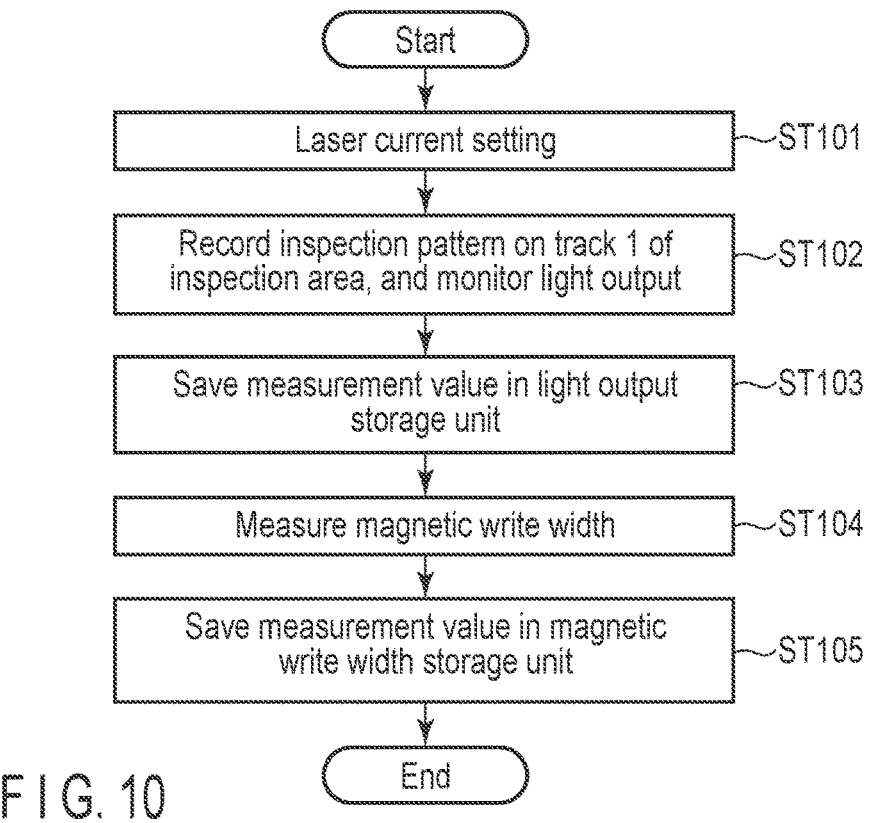
FIG. 10 is a flowchart showing an example of processing of storing a light output and magnetic write width according to the embodiment.

First, the operation of writing data according to the shingled magnetic recording system will be described. FIG. 10 is a flowchart showing an example of processing of storing a light output and magnetic write width to be executed by the MPU 140. It should be noted that this processing is executed by the MPU 140 by, for example, reading a program stored in the memory 160. Further, the timing for executing this processing is before shipment of the magnetic disk device 1.

As shown in FIG. 10, the MPU 140 sets the laser current of laser light to be emitted in the inspection area (ST101). Thereby, the light output to be output from the thermal assist unit 100 is set. Here, the inspection area may be an area different from the user data area of the magnetic disk device 2 or may be a part of a band of the user data area. The band is constituted of a plurality of track groups and, in the shingled magnetic recording system, rewriting of data is carried out in units of so-called bands.

Next, the MPU 140 records an inspection pattern for magnetic write width measurement on a track 1 of the inspection area (ST102). Further, the MPU 140 saves the light output at that time in the light output storage unit 161 (ST103). Thereby, the light output for the track 1 is saved in the light output storage unit 161.

Next, the MPU 140 measures the magnetic write width of the recorded inspection pattern (ST104). Further, the MPU 140 saves the measured magnetic write width in the magnetic write width storage unit 162 (ST105). Thereby, the magnetic write width for the track 1 is saved in the magnetic write width storage unit 162.

As described above, the MPU 140 repetitively carries out the processing of storing the light output emitted from the laser diode 32 and magnetic write width to be written to the inspection area at that time respectively in the light output storage unit 161 and magnetic write width storage unit 162 while changing the setting of the laser current value (steps ST101 to ST105), whereby the MPU can obtain the relationship between the light output and magnetic write width.

Figure 11:
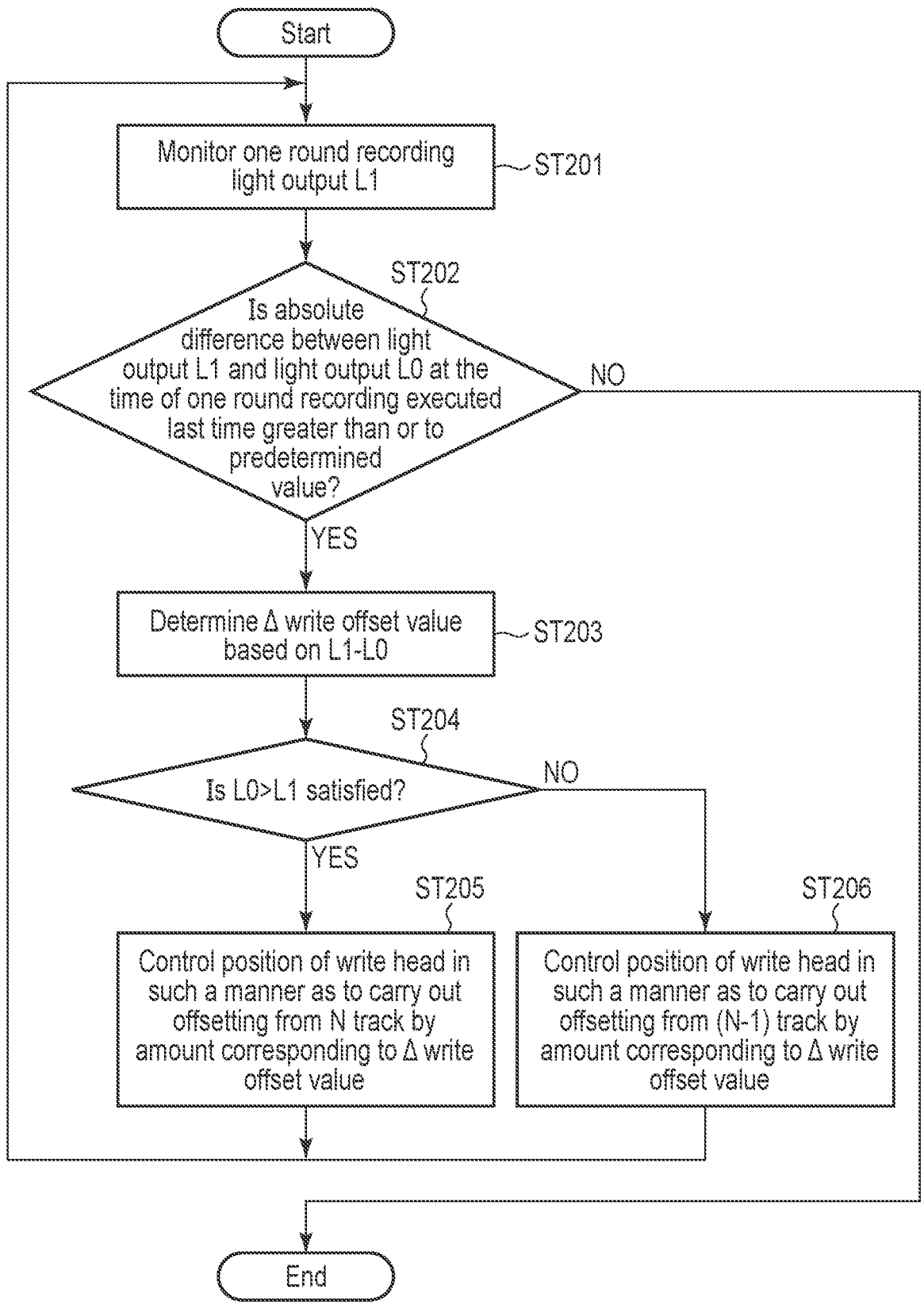
FIG. 11 is a flowchart showing an example of processing of carrying out one round recording on a target track of a user data area according to the embodiment.

Next, the processing of carrying out write of data will be described. FIG. 11 is a flowchart showing an example of processing of carrying out one round recording on a target track of the user data area to be executed by the MPU 140. It should be noted that this processing is executed by the MPU 140 by, for example, reading a program stored in the memory 160. Further, the timing for executing this processing is after shipment of the magnetic disk device 1.

The MPU 140 monitors the one round recording light output L1 (ST201). More specifically, the MPU 140 monitors the light output L1 by means of the monitoring unit 200 at certain timing during the period for carrying out the one round recording of data on the target track. A monitoring result of the monitoring unit 200 is retained in, for example, the memory 160.

Next, the MPU 140 calculates an absolute difference between the light output L1 and light output L0 at the time of one round recording executed last time, and determines whether or not the absolute difference is greater than or equal to a predetermined value (ST202). When it is determined by the MPU 140 that the absolute difference is not greater than or equal to the predetermined value (ST202: NO), the processing is terminated.

On the other hand, upon determination that the absolute difference is greater than or equal to the predetermined value (ST202: YES), the MPU 140 calculates a Δ write offset value based on the value of "light output L1-light output L0" (ST203). More specifically, the MPU 140 determines half the value of a difference between the magnetic write width W1 corresponding to the light output L1 and magnetic write width W0 corresponding to the light output L0 as the Δ write offset value from the relationship between the light output stored in the light output storage unit 161 by the processing of aforementioned FIG. 10 and magnetic write width stored in the magnetic write width storage unit 162.

Next, the MPU 140 determines whether or not the condition "light output L0>light output L1" is satisfied (ST204). Upon determination that the condition "light output L0>light output L1" is satisfied (ST204: YES), the MPU 140 controls, in the case where the MPU 140 has carried out an operation of recording data on the N track in step ST201, the position of the write head 10W in such a manner as to carry out offsetting from the same N track by an amount corresponding to the Δ write offset value (ST205). Thereafter, the processing is advanced to step ST201 described already.

Further, upon determination that the condition "light output L0>light output L1" is not satisfied (ST204: NO), the MPU 140 controls, in the case where the MPU 140 has carried out an operation of recording data on the N track in step ST201, the position of the write head 10W in such a manner as to carry out offsetting from the (N−1) track which is one track before the N track by an amount corresponding to the Δ write offset value (ST206). Thereafter, the processing is advanced to step ST201 described already. When data is rewritten to the (N−1) track which is one track before the N track as in the case of the processing of step ST206, there is, for example, a means for rewriting data after reading data from the (N−1) track or means for rewriting data in such a manner as to always leave write data corresponding to one round recording in the buffer for shingled magnetic recording.

Also when data is written by carrying out offsetting by an amount corresponding to the Δ write offset value in step ST205 or ST206, the light output L1 is monitored (ST201). Here, when the determination in the processing of step ST202 is "YES", it is necessary to change the Δ write offset value set previously. Regarding the change of the Δ write offset value, when the previously set Δ write offset value is set as the first offset value, and Δ write offset value newly calculated in step ST203 is set as the second offset value, the Δ write offset value to be newly set is determined as "the first offset value+second offset value". As described above, the MPU 140 always monitors the light output at the time of write of data, and changes the Δ write offset value, whereby the magnetic disk device 1 can cope with the case where mode hopping occurs. When this processing is completed, the processing is advanced to the next track, then the position of the write head 10W is controlled in such a manner that offsetting by an amount corresponding to the Δ write offset value set by the processing of step ST203 described already is carried out, and then write of data to the next track is started.

Next, the state of the track on which data is recorded by the processing shown in FIG. 11 will be described with reference to FIG. 12 and FIG. 13.

Figure 12:
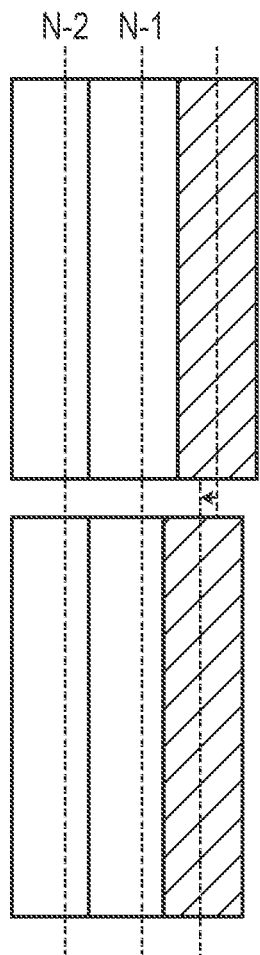
FIG. 12 is view for explaining a case where an absolute difference between a light output LI monitored while recording of data on an N track is carried out and light output LO at the time of one round recording executed last time is greater than a predetermined value according to the embodiment.
Figure 13:
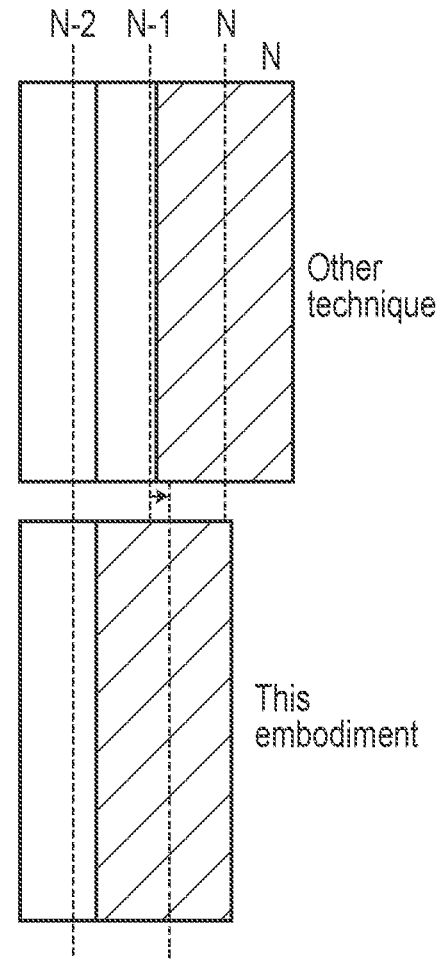
FIG. 13 is a view for explaining a case where an absolute difference between a light output LI monitored while recording of data on an N track is carried out and light output LO at the time of one round recording executed last time is greater than a predetermined value according to the embodiment.

FIG. 12 and FIG. 13 relate to the case where the absolute difference between the light output L1 monitored while recording of data on the N track is carried out and light output L0 at the time of the one round recording executed last time is greater than or equal to the predetermined value. More specifically, FIG. 12 shows the case of "the light output L0>light output L1", i.e., FIG. 12 is a schematic view showing an example of the state of the track on which data is recorded by the processing of step ST205. FIG. 13 shows the case of "the light output L0<light output L1", i.e., FIG. 13 is a schematic view showing an example of the state of the track on which data is recorded by the processing of step ST206. In each of FIG. 12 and FIG. 13, the upper side of the figure shows the case of the technique (the other technique) of the magnetic disk device different from this embodiment, and lower side of the figure shows the case of this embodiment.

In FIG. 12, in the case of the technique of the magnetic disk device, the magnetic write width of the N track is small, and hence the remaining width of the (N−1) track becomes greater than the setting at the time of manufacturing, and thus tracks different from each other in TPI locally occur in the band.

Conversely, in this embodiment, the position of the write head 10W is controlled by carrying out offsetting by an amount corresponding to the Δ write offset value, and data is rewritten to the N track, and hence the remaining width of the (N−1) track is constant and TPI in the band remains unchanged.

Further, in FIG. 13, in the case of the technique of the magnetic disk device, the magnetic write width of the N track is large, and hence the remaining width of the (N−1) track becomes smaller than the setting at the time of manufacturing, and it becomes impossible to maintain the signal quality of the (N−1) track. Conversely, in this embodiment, the position of the write head 10W is controlled by carrying out offsetting by an amount corresponding to the Δ write offset value, and data is rewritten from the (N−1) track. Accordingly, the remaining width of the (N−1) track remains the same as the other tracks, and TPI can be maintained.

According to the magnetic disk device 1 configured to carry out recording of data according to the shingled magnetic recording system and including the thermal assist unit 100, when mode hopping occurs, by adjusting the write offset amount, it is possible to carry out write of data again. Thereby, it is possible for the magnetic disk device 1 to maintain the quality of a signal recorded at the recording density (BPI) and track density (TPI) set in the manufacturing process. Further, the magnetic disk device 1 adopts the shingled magnetic recording system, and hence, unlike the conventional recording system, after recording data on the N track again, it is possible to rewrite data to the (N+1) track. Furthermore, as shown in FIG. 9, in the technique of the magnetic disk described already, the correction-available area W1 is limited as compared with the case of this embodiment, however, in the magnetic disk device 1, even when the track width becomes larger as compared with the technique of the magnetic disk device, the correction-available area W2 is larger, and hence it is possible to prevent the quality of a signal to be recorded on the magnetic disk 2 from being deteriorated.

Second Embodiment

In a second embodiment, a magnetic disk device 1 configured to execute processing coping with a state where the light output does not satisfy a predetermined lower limit will be described. It should be noted that configurations identical to the first embodiment described above are denoted by reference symbols identical to the first embodiment and detailed descriptions of these configurations are omitted.

FIG. 14 is a flowchart showing an example of processing of adjusting a light output to be executed by the MPU 140. It should be noted that this processing is executed by the MPU 140 by, for example, reading a program stored in the memory 160. Further, regarding the timing for executing this processing, the processing is executed before the processing of FIG. 11 described already.

As shown in FIG. 14, the MPU 140 monitors the light output L1 at certain timing during the period for carrying out one round recording on the track (ST301). Next, the MPU 140 determines whether or not the light output L1 is greater than or equal to a predetermined value (ST302). When it is determined by the MPU 140 that the light output L1 is greater than or equal to the predetermined value (ST302: YES), the processing is terminated. The subsequent processing is identical to FIG. 11 described already.

On the other hand, upon determination that the light output L1 is not greater than or equal to the predetermined value (ST302: NO), the MPU 140 carries out recording of data on the track again, and monitors the light output L2 at certain timing during the period for carrying out recording (ST303). Next, the MPU 140 determines whether or not the light output L2 is greater than or equal to the predetermined value (ST304). Upon determination that the light output L2 is greater than or equal to the predetermined value (ST304: YES), when write of data to the N track has been carried out in step ST301, the MPU 140 carries out write of data to the same N track again. It should be noted that when it is determined that the light output L2 is not greater than or equal to the predetermined value (ST304: NO), the processing is returned to ST303, and monitoring of the light output L2 is continued.

When the light output L1 does not satisfy the predetermined value, the magnetic disk 2 is in the state where heating of the medium recording layer of the magnetic disk 2 is insufficient, and hence it is not possible to maintain the signal quality of a track on which recording of data is carried out. Conversely, in the magnetic disk device 1 of this embodiment, by carrying out write of data again after the light output L1 becomes greater than or equal to the predetermined value, it is possible to prevent the signal quality of the track to which write of data is carried out from being deteriorated.

Although in the first and second embodiments described above, the MPU 140 monitors the light output at certain timing during the period for carrying out the one round recording, the monitoring may be carried out twice or more during the period of one round recording. Further, it is unknown that in which range of the one round recording mode hopping occurs, and hence monitoring of the light output may be carried out, for example, in units of sectors.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head including a write head which writes data to the magnetic disk, a thermal assist unit which assists the write head in write of data by using a near-field optical element, and a read head which reads data from the magnetic disk;
   a monitoring unit which monitors a light output; and
   a control unit which controls read of data from the magnetic disk to be carried out by the magnetic head and write of data to the magnetic disk according to a shingled magnetic recording system, wherein
   when carrying out write of data to a first track, if an absolute difference between a light output monitored by the monitoring unit at the time of write and a light output monitored last time by the monitoring unit exceeds a predetermined value, the control unit controls a position of the write head and writes data again to the first track or a second track one track before the first track.

2. The magnetic disk device of claim 1, wherein
   the control unit carries out control of the position of the write head on the basis of an offset amount by which offsetting is carried out in a radial direction of the magnetic disk.

3. The magnetic disk device of claim 2, wherein
   the control unit calculates the offset amount on the basis of an amount of change in a magnetic write width based on a light output monitored by the monitoring unit at the time of write of data, and a light output monitored by the monitoring unit at the time of write of data executed last time.

4. The magnetic disk device of claim 1, wherein
   the monitoring unit monitors the light output twice or more during the period of writing data to the first track.

5. The magnetic disk device of claim 1, wherein
   at the time of write of data, when the light output is less than a predetermined lower limit, the control unit carries out write of data after the light output becomes greater than or equal to the predetermined lower limit.

6. The magnetic disk device of claim 1, further comprising:
   a light output storage unit that stores the light output to be output to an inspection area on which an inspection pattern is to be recorded on the magnetic disk and to be monitored by the monitoring unit; and
   a magnetic write width storage unit which stores a magnetic write width obtained by measuring the inspection pattern recorded on the inspection area, wherein
   the control unit stores the light output and the magnetic write width in the light output storage unit and the magnetic write width storage unit, respectively while changing the light output to be output from the near-field optical element.

* * * * *